United States Patent [19]

Blum

[11] Patent Number: 4,587,064

[45] Date of Patent: May 6, 1986

[54] AERATION APPARATUS FOR LARGE WATERS

[76] Inventor: Albert Blum, Scheiderhöhe, 5204 Lohmar 1, Fed. Rep. of Germany

[21] Appl. No.: 669,084

[22] Filed: Nov. 7, 1984

[30] Foreign Application Priority Data

Nov. 9, 1983 [DE] Fed. Rep. of Germany ....... 3340420

[51] Int. Cl.⁴ .............................................. C02F 1/74
[52] U.S. Cl. .................. 261/37; 210/242.2; 261/120; 261/DIG. 75
[58] Field of Search .............. 210/242.2; 261/120, 261/DIG. 75, 37

[56] References Cited

U.S. PATENT DOCUMENTS

| | | | |
|---|---|---|---|
| 2,983,508 | 5/1961 | Modine | 261/120 |
| 3,235,234 | 2/1966 | Beaudoin | 261/120 |
| 3,320,160 | 5/1967 | Welles, Jr. et al. | 261/120 |
| 3,365,178 | 1/1968 | Boot | 261/120 |
| 3,470,091 | 9/1969 | Budd et al. | 261/120 |
| 3,755,142 | 8/1973 | Whipple, Jr. | 210/242.2 |
| 3,956,432 | 5/1976 | Hilling | 261/120 |
| 4,210,534 | 7/1980 | Molvar | 210/242.2 |
| 4,268,398 | 5/1981 | Shuck et al. | 210/242.2 |
| 4,350,589 | 9/1982 | Stog | 210/242.2 |
| 4,514,343 | 4/1985 | Cramer et al. | 210/242.2 |

FOREIGN PATENT DOCUMENTS

| | | | |
|---|---|---|---|
| 1248837 | 11/1960 | France | 261/120 |
| 955879 | 4/1964 | United Kingdom | 210/242.2 |

Primary Examiner—Tim Miles
Attorney, Agent, or Firm—Brooks & Kushman

[57] ABSTRACT

An aeration apparatus for waters consists of a float element and of at least one aerator unit supported thereby, with a motor-driven pump, with a mixing chamber downstream of the latter, with an air pipe connected to the mixing chamber and with at least one ejector leading out of the mixing chamber. To enable even large waters, such as, for example, marine bays or the like, to be adequately aerated for an acceptable outlay for apparatus, the float element which supports the aerator unit or the aerator units is a walk-on boat hull (1). The aerator units (2) are attached to the exterior wall (9) of the boat hull (1). At least one of the aerator units is constructed as an immersed aerator and can serve as a drive means for the boat hull (FIG. 1).

12 Claims, 3 Drawing Figures

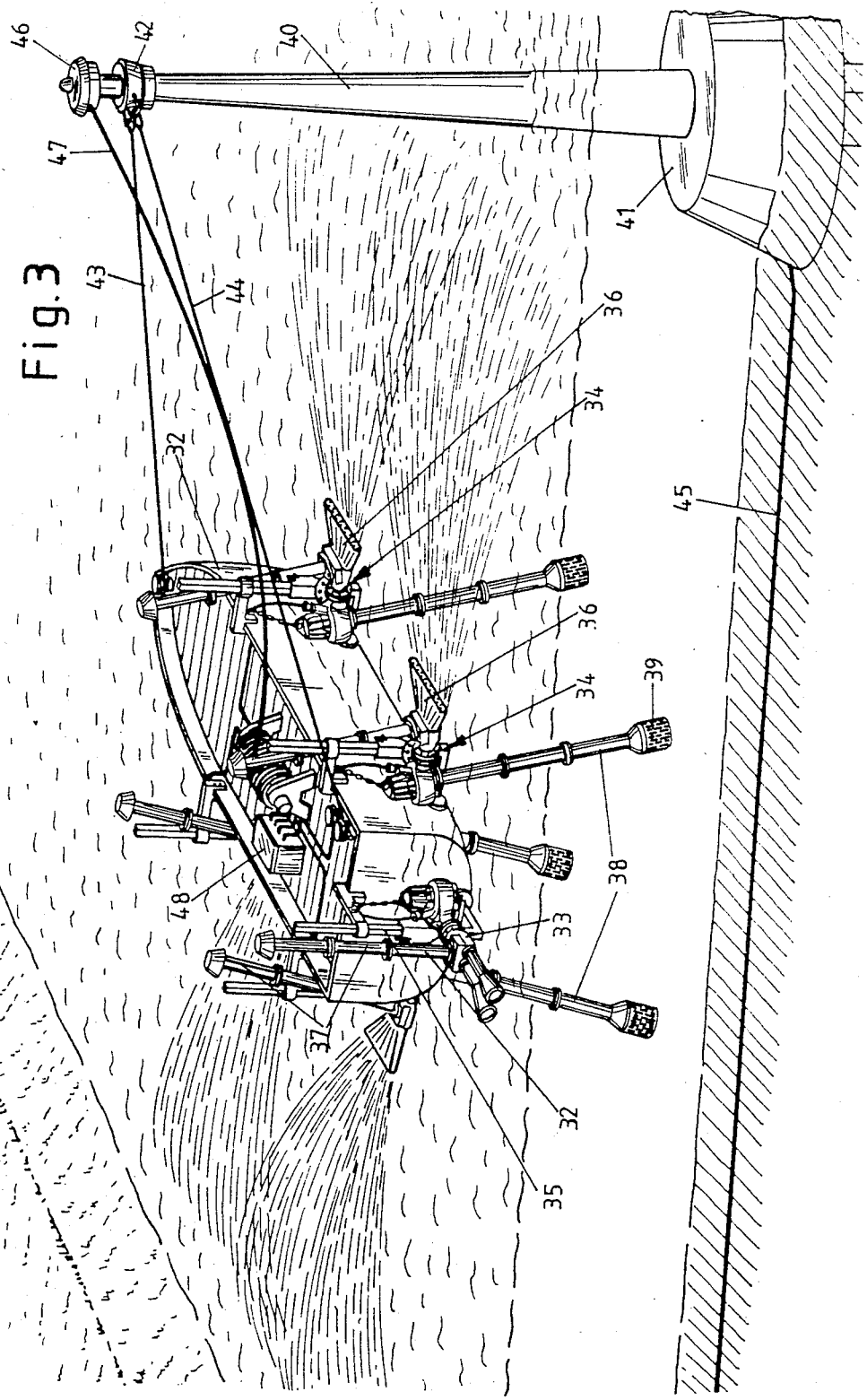

AERATION APPARATUS FOR LARGE WATERS

The invention relates to an aeration apparatus for large waters, consisting of a float element and of at least one aerator unit supported thereby.

Immersed aerators are attached to float elements by means of cables in order to aerate waters which do not exhibit a load-bearing flat bed. Known float elements which are used to support immersed aerators consist of large-diameter steel tubes welded tightly together to form a square or rectangle, so that adequate buoyancy to support the immersed aerator can be achieved. These known aeration apparatuses can be anchored at particularly critical places in ponds or rivers.

The underlying aim of the invention is to aerate adequately large waters, such as, for example, marine bays or the like, for an acceptable outlay for apparatus.

This aim is achieved according to the invention when the float element of the aeration apparatus is a walk-on boat hull.

By the invention, it is possible to attach very large or a large number of small aerator units to the boat. The aerator units can be maintained, repaired and exchanged from the boat. It is furthermore possible to make the entire aeration apparatus mobile, so that the apparatus can either travel along a prescribed course or be moved to the critical zones according to requirements.

A plurality of aerator units is preferably attached to the exterior wall of the boat. In order to make optimum use of the available space in this case, the aerator units may be arranged all round the boat hull.

At least one of the aerator units should be an immersed aerator with a motor-driven pump, with a mixing chamber downstream of the latter, with an air pipe connected to the mixing chamber and with a single ejector leading out of the mixing chamber, or a plurality of ejectors pointing in approximately the same direction, so that this aerator unit can be used as a drive means for the boat hull. In this case the immersed aerator acts as an outboard motor.

It is also obviously possible to employ alternatively a plurality of aerator units to drive the boat hull. Aerator units provided at the bow or stern end may be set in operation selectively to travel forwards and backwards in each case. Alternatively however the ejector tubes may also be pivoted selectively.

The air pipes of all the aerator units are conveniently connected to a common manifold, which is suppliable with pressurised air by at least one central compressor.

Each aerator unit may exhibit a submerged electric motor to drive the pump. Good silencing and simultaneously, good cooling of the motors is achieved by the underwater operation of the motors.

It is also possible for some or all of the aerator units to be connected to a common central pump, so that the outlay for apparatus could possibly be reduced.

The aerator units are preferably arranged to be adjustable in height. By this means it is possible to permit the optimum height adjustment for the respective application in each case.

It may be advantageous, for example, to position the outlet apertures of at least some of the ejectors at the water surface level, which can be effected automatically by the installation of floats. A good auxiliary aeration effect is achieved by this means. This aeration effect is still further improved if the ejectors are constructed as wide-jet nozzles.

The outlet apertures of at least some of the ejectors may also be directed obliquely upwards and located above the water surface level, so that the ejectors act as free-jet nozzles and spray the aspirated water, thereby additionally enriching it with air.

In order to achieve good circulation of the water and also to aerate deeper-lying water layers, the pumps of the aerator units may be provided on their admission connectors with dip tubes extending deep into the water.

A separate electricity generator operable by fuel may be arranged on the boat hull, so that the apparatus is independent and therefore has a wide radius of action.

To permit the aeration apparatus to be operated even without operating staff, the boat hull may be connectable via guide rollers to a guide cable. In this case the drive of the boat hull is conveniently reversible, so that the apparatus can be driven to and fro.

If it is proposed to employ the aeration apparatus only in a relatively small prescribed region, then the boat hull may be connected via at least one retaining cable to an anchorage apparatus which is mounted rotatably on a stationary column. The aeration apparatus may then circulate continuously round the column, or execute pivoting movements about the latter.

The column may exhibit an electricity supply point, so that a central electrical connection provided on the boat hull can be supplied with electricity via an electric cable. The current collection at the column may occur via sliding contacts, for example.

The invention is illustrated in exemplary manner in the drawing and described below in detail with reference to the drawing, wherein:

FIG. 3 shows another embodiment of the aeration apparatus.

Figure 1:
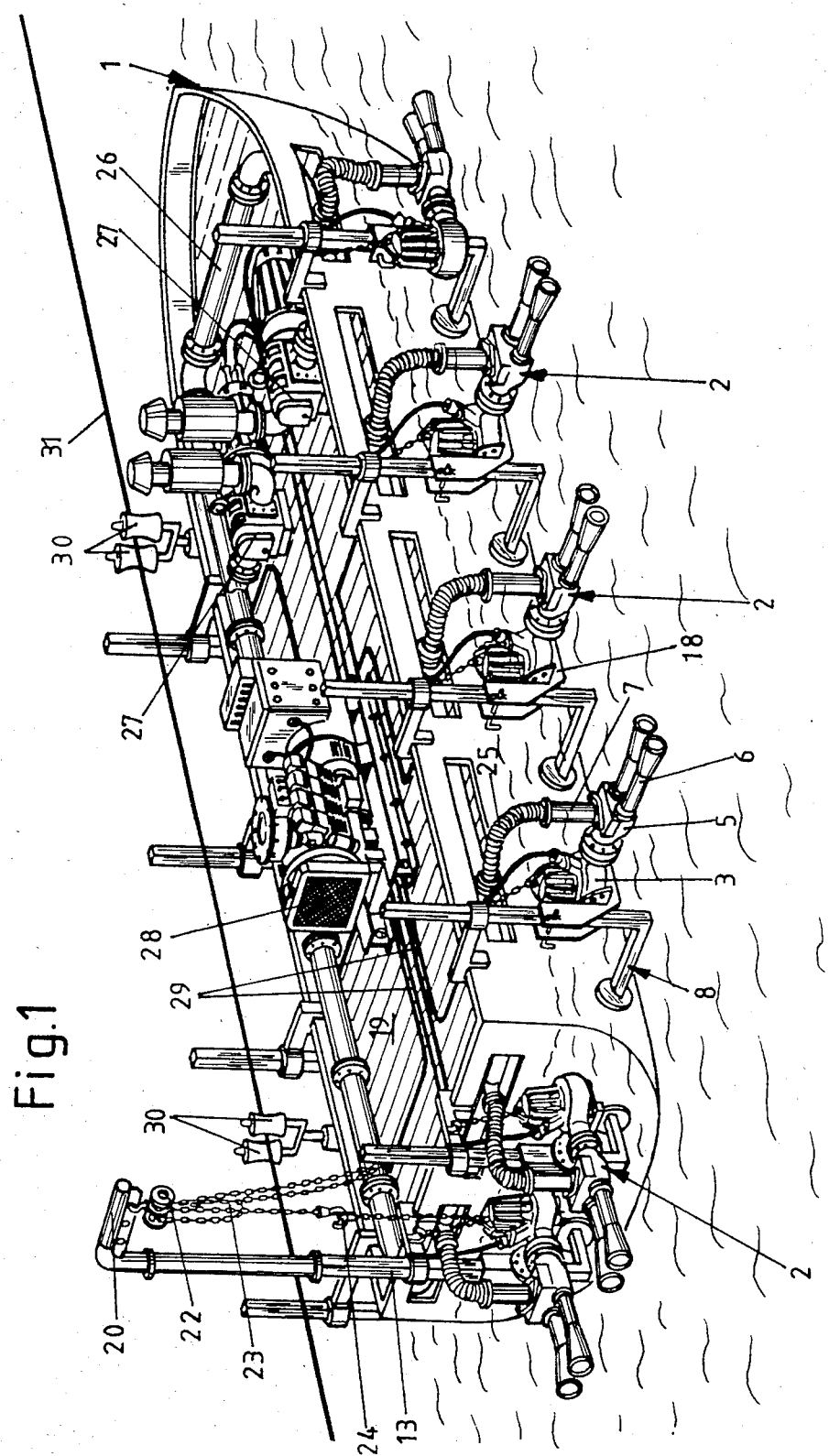
FIG. 1 shows an embodiment of an aeration apparatus.

According to FIG. 1, the aeration apparatus consists of a boat hull 1, to the exterior wall of which a plurality of aerator units 2 are attached all round. The aerator units 2 are constructed as immersed aerators and consist of a pump 3, a submerged motor 4 driving the latter, a mixing chamber 5 downstream of the submerged pump 3, two ejectors 6 leading out of the mixing chamber 5, and an air pipe 7 leading into the mixing chamber 5.

Figure 2:
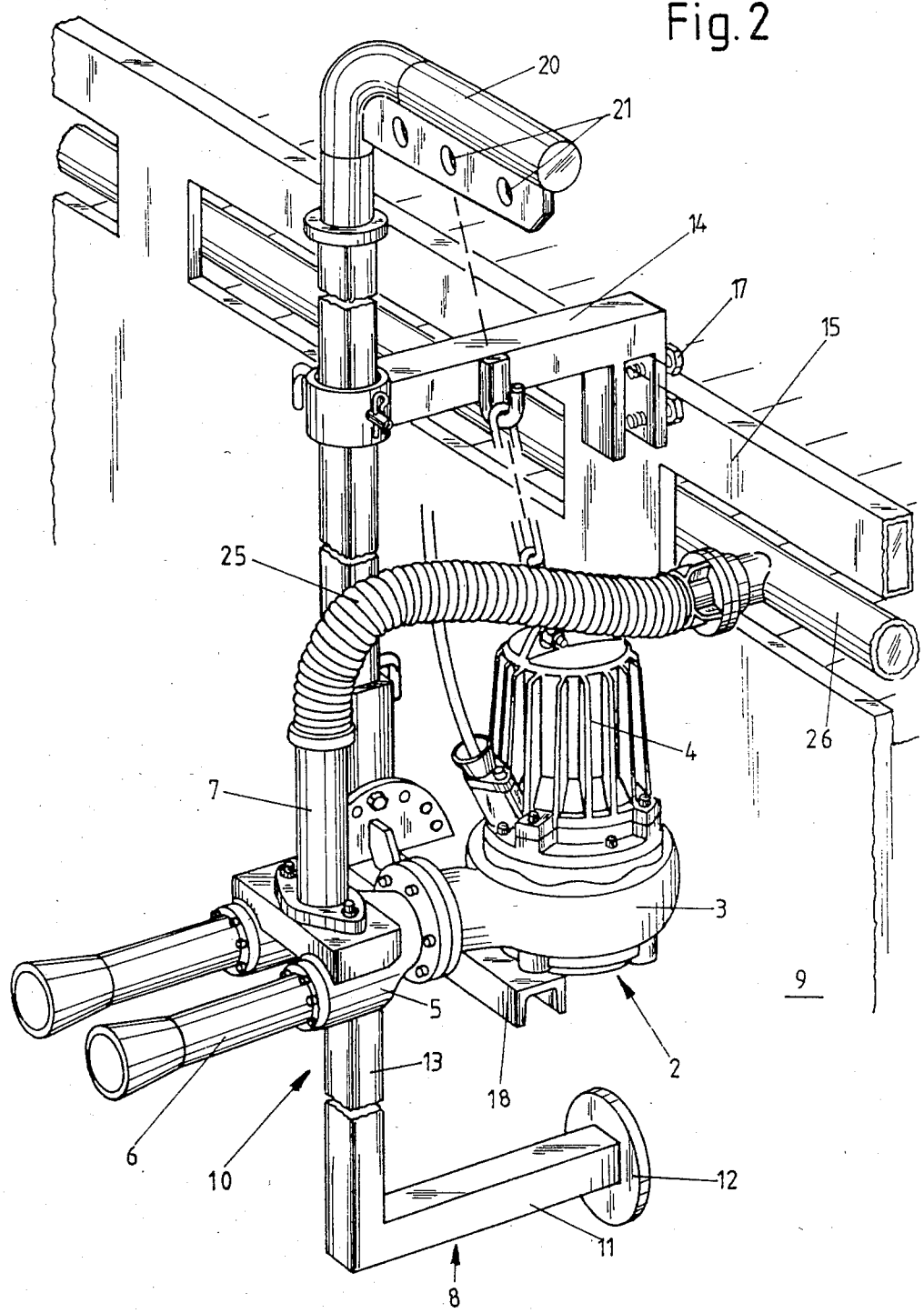
FIG. 2 shows on a larger scale an individual aerator unit from FIG. 1.

As is clear particularly from FIG. 2, the aerator unit 2 is mounted on a bracket structure 8, which is attached detachably to the boat wall 9. The bracket structure comprises an L-shaped bracket 10, the short member of which is directed towards the boat wall and braced against the boat wall 9 via a retaining plate 12. The long member 11 extends approximately vertically upwards and is attached in its upper region via a vertically adjustable transverse bracket to the top edge 15 of the boat wall. The transverse bracket 14 engages by a claw 16 over the top edge of the boat wall and is secured there by means of retaining screws 17.

A platform 18, which serves to support the aerator unit 2, is attached vertically adjustably to the long member 13 of the bracket structure 8. The platform can be slid on the member 11 of the bracket structure 8 according to the required depth of immersion of the ejectors. The platform 18 is also angularly adjustable, so that the angle of inclination desired in each case for the ejectors 6 can be selectively adjusted.

The boat hull 1 may be of any desired size. It is important that the entire top superstructure 19 can be walked on, so that all the aerator units 2 arranged all round the boat hull 1 are easily accessible.

When it is required to dismantle an aerator unit for maintenance purposes or for exchange, it is possible to plug onto the top end of the members 13 of the bracket structure 8 a support arm 20 which exhibits, in various positions, retaining bores 21 for suspending a crane 22 with chain 23 and load hook 24.

Maintenance and repair operations can then be performed conveniently on board with the aerator units 2 dismantled.

In the exemplary embodiment illustrated in FIG. 1 all the air pipes 7 of the aerator units 2 are connected via flexible connecting pieces 25 to a common manifold 26, which extends all round the entire boat hull. The manifold is supplied with pressurised air by means of two compressors 27 arranged in the bows. Separate individual compressors for the aerator units 2 are thereby rendered unnecessary.

A diesel unit 28 for on-board electricity supply is also provided on the boat hull 1. Electric cables 29 lead from the diesel unit 28 to each individual submerged motor 4 of the aerator units 2.

The boat hull 1 with its aerator units 2 can be driven by one operator with complete freedom to any desired point on an area of water where it is required for service. The two stern aerator units serve as a drive means for this purpose. During the journey the laterally directed aerator units may remain in service and continue their aeration work during the journey. Two aerator units, the ejectors of which point in the direction of travel, are provided at the bow of the boat hull 1. These ejectors must obviously be switched off in the case of travel ahead. These ejectors may be switched on when the boat hull is stationary, when all the aerator units are in service, because the recoil forces of all the ejectors then cancel each other. When the two stern aerator units are switched off, the two bow aerator units may be employed for the travel of the boat hull 1 astern.

If the apparatus is to be operated for a time without operating staff, then the boat hull 1 may be guided via guide rollers 30 on a tensioned cable 31. The boat hull may then, for example, cross the water in one direction travelling ahead with the bow aerator units switched off, and then, after automatic reversal of the drive means, in the opposite direction travelling astern.

Another exemplary embodiment of the aeration apparatus is illustrated in FIG. 3. The aeration apparatus consists in the present case of a small boat hull 32, to the stern of which an immersed aerator 33 is attached. This immersed aerator corresponds substantially to the aerator units 2 of the first exemplary embodiment, so that there is no need to repeat its description. Two further aerator units 34 are also provided on each of the two sides of the boat hull 32. The aerator units are attached to the boat hull 32 by means of bracket structures 35, which correspond substantially to the bracket structures 8 from FIG. 1.

The aerator units 34 arranged on both sides of the boat hull 32 each exhibit, instead of underwater ejectors, a wide free-jet nozzle 36. By oblique positioning of the aerator units 34, the free-jet nozzles 36 project obliquely out of the water, so that the aspirated water can be sprayed freely across the water surface. An auxiliary aeration effect is achieved by the spraying.

In this exemplary embodiment the air pipes 37 of the aerator units 33 and 34 are not supplied with pressurised air, but lead freely upwards, whilst air is admitted automatically by the pump operation.

Dip tubes 38, which extend deep into the water to be aerated, are connected by flanges to the suction connectors of the aerator units 34, so that a circulatory effect is simultaneously achieved and deeper-lying water layers can also be aerated. The inlet ends of the dip tubes 38 are provided with suction cages 39, so that no large objects can be drawn in.

In the exemplary embodiment illustrated in FIG. 3, the aerator unit serves to aerate a locally restricted region. In this case the boat hull is anchored to a central column 40, which is mounted stationary in a concrete foundation 41. The column exhibits, at an interval from its top end, a rotatably mounted anchorage device 42, to which the boat hull 32 is attached via two retaining cables 43 and 44. One retaining cable 43 is attached to the bow of the boat hull, and the other retaining cable 44 to the stern. When the immersed aerator 33 is operated the boat hull revolves automatically round the column 40.

An earthed electric cable 45, which leads to the column 40, is connected to electrical connections provided in the column top. A rotary sliding contact unit 46, from which an electric cable 47 leads to a junction box 48 on the boat hull 32, is mounted on the top of the column. Individual conductors lead from the junction box 48 to the motors of the individual aerators 33 and 34.

The radius of travel of the boat hull 32 can be adjusted by paying out the retaining cables 43 and 44, and the electric cable 47, more or less.

As may be seen from the exemplary embodiments described above, the aeration apparatus according to the invention is extremely variable and capable of versatile application. All the advantages of boat operation can be utilised, and the aerators can be operated optimally and maintained with ease.

I claim:

1. Aeration apparatus for large waters, consisting of one float element and a plurality of aerator units supported thereby, characterized in that the float element is a walk-on boat hull (1;32) wherein the aerator units (2; 33; 34) are arranged all around the boat hull and are attached to the exterior wall (9) of the boat hull (1; 32) and wherein at least one of the aerator units comprises an immersed aerator (2; 33) with a motor-driven pump, and a submerged electric motor to drive the pump, with a mixing chamber downstream of the latter, with an air pipe connected to the mixing chamber and with a single ejector leading out of the mixing chamber or a plurality of ejectors (6) pointing in approximately the same direction, and that the aerator unit is provided as drive means for the boat hull (1; 32).

2. Aeration apparatus according to claim 1, characterised in that the air pipes (7) of all the aerator units (2) are connected to a common manifold (26) and that the manifold (26) is suppliable with pressurised air by at least one central compressor (27).

3. Aeration apparatus according to claim 1, characterised in that some or all of the aerator units (2;33,34) are connected to a common central pump.

4. Aeration apparatus according to claim 1, characterised in that the aerator units (2;33,34) are arranged to be adjustable in height.

5. Aeration apparatus according to claim 1, characterised in that the ejectors are constructed as wide-jet nozzles (36).

6. Aeration apparatus according to claim 1, characterised in that the outlet apertures of at least some of the ejectors are located at the water surface level.

7. Aeration apparatus according to claim 1, characterised in that the outlet apertures of at least some of the ejectors (36) are directed obliquely upwards and located above the water surface level.

8. Aeration apparatus according to claim 1, characterized in that the pump (3) of the one aerator unit (34) exhibits on its suction connector, a dip tube (38) extending deep into the water.

9. Aeration apparatus according to claim 1, characterised in that an electricity generator (28) operable by fuel is arranged on the boat hull (2).

10. Aeration apparatus according to claim 9, characterised in that the boat hull (1) is connectable via guide rollers (30) to a guide cable (31), and that the drive of the boat hull (1) is automatically reversible.

11. Aeration apparatus according to claim 1, characterised in that the boat hull (32) is connected via at least one retaining cable (43,44) to an anchorage device (42) which is mounted rotatably on a stationary column (40).

12. Aeration apparatus according to claim 11, characterised in that the column (40) exhibits an electricity supply point (45), and that a central electrical connection (48) provided on the boat hull (32) is connected via an electric cable (47) to the electricity supply point of the column (40).

* * * * *